United States Patent [19]
Kadowaki et al.

[11] 3,903,149
[45] Sept. 2, 1975

[54] PROCESS FOR PRODUCTION OF ACRYLIC ACID

[75] Inventors: Kojyu Kadowaki; Takeo Koshikawa; Bunji Oshida, all of Ibaraki, Japan

[73] Assignee: Mitsubishi Petrochemical Company, Limited, Japan

[22] Filed: Aug. 21, 1973

[21] Appl. No.: 390,188

[30] Foreign Application Priority Data
Aug. 31, 1972  Japan.............................. 47-87361

[52] U.S. Cl............. 260/530 N; 252/456; 252/464; 252/470
[51] Int. Cl...................... C07c 57/04; C07c 51/32
[58] Field of Search................................ 260/530 N

[56] References Cited
UNITED STATES PATENTS
3,574,729  4/1971  Gasson............................ 260/530 N
3,595,911  7/1971  Ball................................. 260/530 N FOREIGN PATENTS OR APPLICATIONS
2,050,155  5/1972  Germany......................... 260/530 N Primary Examiner—Lorraine A. Weinberger
Assistant Examiner—Richard D. Kelly
Attorney, Agent, or Firm—Robert E. Burns; Emmanuel J. Lobato; Bruce L. Adams

[57] ABSTRACT

Acrolein is subjected to vapor phase oxidation to acrylic acid over an oxide catalyst which has the following atomic ratio of the components except for oxygen:

$$Sb_a Ni_b Mo_c V_d W_e$$

where:
a = 100
b = 5 to 200
c = 10 to 1,000
d = 5 to 300
e = 1 to 200.

7 Claims, No Drawings

PROCESS FOR PRODUCTION OF ACRYLIC ACID

BACKGROUND OF THE INVENTION

The present invention relates to a process for the production of acrylic acid from acrolein by the catalytic oxidation thereof in the vapor phase, and it provides a process of producing acrylic acid which is industrially advantageous due to the use of a catalyst with an extremely high performance and long life. More particularly, the present invention is concerned with the use of a catalyst consisting of antimony, nickel, molybdenum vanadium, tungsten and oxygen in catalytic the oxidation of acrolein, in the vapor phase, with molecular oxygen for the production of acrylic acid.

It has been known that as a catalyst for the reaction referred to above, catalysts comprising molybdenum oxides and vanadium oxides may be effectively used, which is described in, for example, Japanese Pat. Publication Nos. 12886/1969, 1775/1966 and 6262/1966.

However, as far as the inventors know, the performance of these catalysts is not always satisfactory from the industrial point of view. By way of example, Japanese Pat. Publication No. 1775/1966 discloses that the catalytic oxidation of acrolein may give a perpass yield of only 76 mole % of acrylic acid.

Under these circumstances, a large number of studies have been made to increase the oxidation yield: for example, Japanese Pat. Publication No. 9045/1968 discloses that it is possible to give a yield of 84.6 mole % of acrylic acid by using the catalysts supported on aluminum sponge and having been subjected to a particular activation treatment before the use.

Alternatively, there is disclosed in Japanese Pat. Publication No. 22850/1965 that a yield of 82.7 mole % of acrylic acid may be accomplished by using a catalyst which is prepared by firstly preforming a double oxide of antimony and iron, impregnating and oxide with the ammonium salts of molybdenum and vanadium, followed by calcination at several steps.

On the other hand, these catalysts consisting mainly of molybdenum and vanadium are not always sufficient in catalyst life for industrial use. For example, Japanese Pat. Publication No. 28712/1968 discloses that such catalysts gradually lose their activity during use, and therefore this patent has made it possible to reactivate the spent or worn catalyst.

Prior to this invention, the present inventors have invented a novel process comprising using a catalyst with high performance and long life which consists of antimony, nickel, molybdenum, vanadium and oxygen as a solution to the aforementioned problems in practicing said oxidation reaction at an industrial scale and filed Japanese Patent Application thereon (i.e. Pat. Application No. 8512/1971, for convenience hereinafter called the original invention).

SUMMARY OF THE INVENTION

As a result of earnest study on the original invention for the purpose of improving the catalyst performance, the present inventors have discovered surprising facts that through the use of a catalyst consisting of antimony, nickel, molybdenum, vanadium and tungsten, several excellent advantages such as an increase in acrylic acid yield, a reduction in reaction temperature and an enhancement in heat resistance of the catalyst have not only been provided, but also a high improvement in reproductivity of the catalyst preparation may be attained, which has led to this invention.

Thus, with regard to the yield of acrylic acid the catalyst used in the process according to the present invention gives a perpass yield of 86.8 mole % of acrylic acid at a reaction temperature of 250°C, while the catalyst according to the original invention gives a per-pass yield of 84.2 mole % of acrylic acid at a reaction temperature of 270°C, and thus it is apparent that the present catalyst is more effective than the original catalyst.

In particular, the lower reaction temperature, in conjunction with the excellent heat resistance as described hereinafter, shows that the catalyst according to the present invention possesses a great advantage in its life.

The inventors have examined the catalyst containing molybdenum and vanadium oxides as the main component by means of X-ray diffraction before and after use in the reaction for a long period of time and have found that a crystallization of molybdenum trioxide occur during use and that there is a close correlation between the crystallization degree and the decrease in activity of the catalyst.

The inventors have also found that if the type of this catalyst is heat-treated in air, the crystallization rate of molybdenum trioxide increases rapidly from a temperature exceeding about 400°C, and that if the catalyst according to the original invention is calcined at a higher temperature, e.g. 500°C, the activity of the catalyst is lowered and the catalyst species disappear.

In view of the above facts, it will be appreciated that the catalyst species are required to be thermally stable in order that the catalyst functions are effective for a long period of time, and in this correlation, the degree of crystallization of molybdenum trioxide during heat treatment may be indicative of stability.

On the basis of this knowledge, we have divised a method, as described hereinafter in Example 4, and effected a comparative test on heat resistance between the present catalyst and the original catalyst and obtained much better results for the present catalyst. In addition, by conducting a practical life test it was confirmed that the present catalyst has sufficient durability even if it is used over a long period of time.

Also, it may be expected that the catalyst, according to the present invention, will provide wider limits of the production conditions thereof, and better reproductability of catalyst production as compared with the catalyst according to the original invention, thereby providing excellent advantages in quality control in the production at an industrial scale.

DETAILED DESCRIPTION OF THE INVENTION

The composition of the catalyst according to the present invention is indicated in terms of atomic ratio as follows, except for oxygen. The oxygen content, is not specified herein because the oxidation state of each of the catalyst constituents is not necessarily clear.

$Sb_a$ $Ni_b$ $Mo_c$ $V_d$ $W_e$

| | | |
|---|---|---|
| a | = | 100 |
| b | = | 5 to 200 | preferably 15 to 150 |
| c | = | 10 to 1,000 | preferably 10 to 500 |
| d | = | 5 to 300 | preferably 5 to 150 |
| e | = | 1 to 200 | preferably 1 to 100 |

The starting materials of the catalyst components are almost the same as those conventionally used, and any oxides or materials convertible to oxides by calcination in air may be used. For example, as the antimony component, antimony oxide, metallic antimony; as the nickel constituent, nickel nitrate, nickel chloride; as molybdenum constituent, ammonium molybdate, molybdenum oxide; as the vanadium constituent, ammonium vanadate, vanadium oxide; as the tungsten constituent, ammonium tungstate, tungsten oxide may be used.

The preparation process of the catalyst from these starting materials or precursor compounds of the catalyst components is also conventional. For example, at least two of these materials are intimately mixed in a solution state or a slurry state, preferably in an aqueous solution or slurry, and, if necessary, carrier materials or precursor compounds thereof such as silica are added thereto, and thereafter the mixture is vaporized to dryness, moulded, and then is calcined in air at a temperature of the order of between 270° and 450°C for a time of the order of 1 to 40 hrs. It is preferred that antimony oxide and nickel oxide are together converted into a binary oxide form such as nickel antimonate, and in the course of the preparation calcining or heattreating of the mixture at a temperature between 300° and 1,000°C, preferably between 400° and 900°C after mixing the starting materials for both constituents, in order to bring about a specially good reproducibility and performance.

Also, this catalyst may be advantageously supported on a carrier utilizing its high activity quality from an economical standpoint. In this case, silica, alumina, silicon carbide and the like may be used as the carrier, and the use of these carriers makes it possible to control to some extent the mechanical strength and thermal stability of the catalyst and the reaction rate, and the like.

The process of producing acrylic acid in accordance with the present invention is substantially identical to the conventional catalytic oxidation of acrolein except for the use of the aforementioned catalyst.

The reaction basically comprises contacting a feed gas containing acrolein and molecular oxygen with the said catalyst in suitable condition.

The reaction is carried out at an elevated temperature between, for instance, 200° and 350°C. The reaction may also be carried out under pressure of, for example, from 0.5 to 10 atmospheres absolute.

The contact time may be, for example, in the range between 0.5 to 20 seconds.

In the composition of the feed gas the mole ratio of oxygen to acrolein ranges preferably from 0.5 to 5, one to 20 mole of steam to 1 mole of acrolein may be present as a diluent. Other diluent gases such as nitrogen, carbon dioxide, methane, propane and the like may be used.

A more economical process of producing acrylic acid, making the best use of the present method, comprises producting acrylic acid directly from propylene by means of the so-called two-stage continuous method wherein the conventional catalyst for producing acrolein by the catalytic oxidation of propylene is used in combination with the present catalyst.

In this method, the gas leaving the outlet of the first reactor, for producing acrolein, can be introduced directly into the second reactor charged with the present catalyst without separating the components of any reaction product formed in the first reactor, although, if necessary, said product gas may be mixed with oxygen or diluent gases before being introduced into the second reactor.

In this case, the performance of the present catalyst is not substantially adversely affected by the by-products from the former or first reactor, such as carbon monoxide, acetic acid, acetaldehyde or the unreacted propylene.

The catalyst according to the present invention provides an extremely high yield and has a long life under such usage conditions as referred to above, which makes it possible to produce acrylic acid economically.

The invention will further be illustrated by the following examples.

The conversion, selectivity and yield are based on the mole percentage, respectively.

EXAMPLE 1

(Preparation of catalyst)

157 g. of metallic antimony is added in small portions to 700 ml. of concentrated nitric acid with stirring to oxidize it. Then, thereto is added a solution of 157 g. of nickel nitrate in 150 ml of pure water, and the mixture is heated with stirring to evaporate to dryness. The resulting solid mass is ground, and calcined at 800°C for 3 hrs. in air, and the powder so produced is added to a solution of 700 ml. of pure water containing 79.5 g. ammonium paramolybdate and 10.5 g. ammonium metaanidate dissolved under heat thereinto. Further, to this mixture are added a solution 10.0 g. of ammonium paratungstate in 200 ml. of warm water and a silica sol containing 54g. of $SiO_2$, after which the mixture is intimately mixed.

The resulting slurry is evaporated to dryness, ground and calcined at 350°C for an hour in air. This powder is moulded into a 40 × 4 m/m tablet, and fired at 380°C for 5 hours in air.

The catalyst thus obtained has the following atomic ratio calculated from the charge materials:

Sb: Ni : Mo : V : W : (Si) = 100 : 42 : 35 : 7 : 3 : (70)

(Oxidation reaction)

50 ml. of this catalyst was placed in a reaction tube made of stainless steel having an inner diameter of 20 m/m and was heated through a niter bath to oxidize acrolein catalytically.

The feed gas, consisting of 4% of acrolein, 46% of steam and 50% of air was, passed into the reactor at a space velocity of 1,050 hr.$^{-1}$ on the basis of 0°C and normal pressure. The reaction was carried out at the bath temperature of 250°C. The results obtained were as as follows:

| | |
|---|---|
| Acrolein conversion | 97.3 mole % |
| Acrylic acid selectivity | 89.2 mole % |
| Acrylic acid yield | 86.8 mole % |

EXAMPLE 2

According to the procedure set forth in Example 1 the catalyst having the following atomic ratio: Sb: Ni: Mo: V: W: (Si) = 100: 42: 71: 14: 9: (70) was prepared and the oxidation reaction of acrolein was carried out under the same reaction conditions as Example 1. The following results were obtained:

| | |
|---|---|
| Acrolein conversion | 95.2 mole % |
| Acrylic acid selectivity | 88.3 mole % |
| Acrylic acid yield | 84.1 mole % |

EXAMPLE 3

The catalyst having the atomic ratio of Sb: Ni: Mo: V: W: (Si) = 100: 42: 897: 300: 90: (143) was prepared according to the procedure set forth in Example 1.

50 ml. of this catalyst was placed in a reaction tube made of stainless steel having an inner diameter of 20 m/m and, was heated through a niter bath to conduct the catalytic oxidation of acrolein.

The feed gas, consisting of 4% of acrolein, 46% of steam and 50% of air, was passed into the reactor at a space velocity of 1,350$(hr)^{-1}$ on the basis of 0°C and normal pressure. The reaction was carried out at the bath temperature of 240°C. The results obtained were as follows:

| | |
|---|---|
| Acrolein conversion | 93.9% |
| Acrylic acid selectivity | 82.3% |
| Acrylic acid yield | 77.3% |

EXAMPLE 4

The following heat-resistance test was conducted in order to evelute the catalyst life.

The catalyst prepared according to the procedure set forth in Example 1 and a catalyst containing no tungsten which was prepared according to the original invention were heat-treated in a muffle furnace, and thereafter the degree of crystallization of molybdenum trioxide in the respective catalysts was determined before and after said treatment by means of X-ray diffraction.

Both catalysts were subjected to heat-treatment at 410°C for 5 hours. The X-ray determination conditions are shown hereunder, and the determination results are indicated in Table 1.

X-RAY DIFFRACTION DETERMINATION CONDITIONS: Model D-3F X-ray diffraction apparatus, manufactured by Rigaku Denki Co.

EXAMPLE 5

A catalyst consisting mainly of molybdenum trioxide for use in producing acrolein was placed in the first reactor and the catalyst described in Example 1 was placed in the second reactor to continuously carry out the synthesis of acrylic acid from propylene for one month running and the catalyst life test was also carried out.

The reaction tube which was made of stainless steel (SUS NO. 27) had an inner diameter of 16 m/m and a length of 600 m/m and was equipped with a jacket for a niter bath. Two of these reaction tubes were connected in series in such a manner that one of them was the first reactor and the other the second reactor. Further, the design of this device was such that it was possible to analyze the product at both the outlet of the first and the outlet of the second reactors, and the outlet of the latter was provided with a pressure regulating valve so as to effect the reaction under varied pressure.

30 ml. of the catalyst consisting mainly of molybdenum trioxide for use in producing acrolein and in admixture with 20 ml. of ceramic Raschig rings was placed in the former (First) reactor, and 10 ml. of the catalyst of Example 1 in admixture with 20 ml. of ceramic Raschig rings in the latter (Second) reactor. Thereafter, the continuous operation was carried out under the following conditions:

| | |
|---|---|
| The feed composition | propylene 5%, steam 40%, air 55% |
| Reaction pressure | 3 atm. |
| Space velocity | 650 $(hr)^{-1}$ at the former |
| | 1950 $(hr)^{-1}$ at the latter |
| | (based on the volume at 0°C under the reaction pressure) |
| Reaction temperature | 380°C at the former |
| | 300°C at the latter |

The results of the operation are set forth in Table 2. This Table demonstrates that at the beginning of the operation some change in activity is observed, but after the 10 days' operation little change in activity occurs in both the former and the latter reactors, and thus these catalysts function effectively for a long period of time even under such severe conditions.

Results

Table 1

| | Original Catalyst Sb: Ni: Mo: V: (Si) 100 : 42 : 35 : 7 : (70) | | Present Catalyst Sb: Ni: Mo: V: W: (Si) 100 : 42 : 35 : 7 : 3 : (70) | |
|---|---|---|---|---|
| | Before heat treatment | After heat treatment | Before heat treatment | After heat treatment |
| $MoO_3$(020) face peak height | 7 mm | 75 mm (10.7 times) | 7 mm | 28 mm (4.0 times) |
| $MoO_3$(040) face peak height | 31 mm | 110 mm (3.5 times) | 21 mm | 47 mm (2.2 times) |

Target Cu
Filter Ni
Voltage 35 KVP
Current 15 mA

It can be seen from Table 1 that the present catalyst has a less crystallization degree of molybdenum trioxide and better heat-resistance than the original catalyst.

Table 2

| Analysis Place | Reactor result | 1 | running day 10 | 20 | 30 |
|---|---|---|---|---|---|
| The former reactor outlet | Propylene conversion (%) | 80.2 | 85.0 | 86.1 | 86.5 |
|  | Acrolein yield (%) | 62.5 | 68.5 | 67.0 | 68.4 |
|  | Acrylic acid yield (%) | 12.3 | 10.5 | 10.9 | 9.6 |
| The latter ractor outlet | Propylene conversion (%) | 84.0 | 85.8 | 86.4 | 89.4 |
|  | Acrolein yield (%) | 13.6 | 16.5 | 16.2 | 17.0 |
|  | Acrylic acid yield (%) | 53.8 | 53.4 | 54.2 | 54.6 |
| Acrolein conversion (%) at the latter |  | 78.2 | 75.9 | 75.8 | 75.1 |

Further, the test was carried out with a catalyst containing no tungsten component of the atomic ratio of Sb: Ni: Mo: V: (Si) =100:45: 35: 7: (70). The results were such that the acrolein conversion at the latter reactor was 74.8% after 1 day, 73.3% after 7 days, 70.9% after 15 days and 66.7% after 30 days.

What we claim is:

1. In the process for the production of acrylic acid which comprises catalytically oxidizing acrolein with molecular oxygen or a mixture gases containing molecular oxygen in the presence of a catalyst, the improvement which comprises the use of a catalyst consisting essentially of antimony, nickel, molybdenum, vanadium, tungsten and oxygen, the atomic ratios of said essential constituents (except of oxygen) being 5 to 200 of nickel, 10 to 1,000 of molybdenum, 5 to 300 of vanadium and 1 to 200 of tungsten, on the basis of 100 atomic units of antimony said nickel being present in the form of the binary oxide, nickel antimonate.

2. A process for the production of acrylic acid as claimed in claim 1 in which the atomic ratio of said constituents of the catalyst except for oxygen is:

Sb : 100
   Ni : 15 to 150
   Mo : 10 to 500
   V  : 5 to 150
   W  : 1 to 100

3. A process for the production of acrylic acid as claimed in claim 1, wherein the starting materials for said antimony constituent and for the nickel constituent are mixed and the mixture is dried and calcined to form said nickel antimonate.

4. A process for the production of acrylic acid as claimed in claim 3 in which the mixture is calcined at a temperature of from 300°C to 1000°C.

5. A process for the production of acrylic acid as claimed in claim 4 in which the mixture is calcined at a temperature of from 400° to 900°C.

6. A process for the production of acrylic acid as claimed in claim 4 in which the remaining starting materials for the catalyst constituents are added to the calcined mixture of nickel antimonate and the catalyst constituent mixture is heat-treated at temperatures in range 270°–450°C to form said catalyst.

7. A process for the production of acrylic acid as claimed in claim 1 in which said acrolein is provided directly from the products of the catalytic vapor phase oxidation of propylene.

* * * * *